(12) United States Patent
Patrick et al.

(10) Patent No.: US 11,951,911 B2
(45) Date of Patent: Apr. 9, 2024

(54) MOUNTING SYSTEM, APPARATUS, AND METHOD FOR SECURING ONE OR MORE DEVICES TO A VEHICLE WINDOW

(71) Applicants: Avery Oneil Patrick, East Brunswick, NJ (US); Katherine Louise Porter, Jackson, NJ (US)

(72) Inventors: Avery Oneil Patrick, East Brunswick, NJ (US); Katherine Louise Porter, Jackson, NJ (US)

( * ) Notice: Subject to any disclaimer, the term of this patent is extended or adjusted under 35 U.S.C. 154(b) by 49 days.

(21) Appl. No.: 17/823,737

(22) Filed: Aug. 31, 2022

(65) Prior Publication Data
US 2023/0085154 A1    Mar. 16, 2023

Related U.S. Application Data

(60) Provisional application No. 63/360,186, filed on Sep. 13, 2021.

(51) Int. Cl.
*B60R 11/00*     (2006.01)
*G06V 20/58*     (2022.01)

(52) U.S. Cl.
CPC ......... *B60R 11/00* (2013.01); *B60R 2011/004* (2013.01); *B60R 2011/0059* (2013.01); *G06V 20/58* (2022.01)

(58) Field of Classification Search
CPC ...... F16M 13/022; F16M 13/02; G03B 17/08; G03B 17/02; G03B 17/561; G03B 37/04; G03B 35/08; B60R 11/00; B60R 2011/0059; B60R 2011/004; E05B 73/00; E05B 73/0023; E05B 65/52; E05B 67/08

USPC .......................................................... 248/208
See application file for complete search history.

(56) References Cited

U.S. PATENT DOCUMENTS

| | | | | |
|---|---|---|---|---|
| 3,536,285 A | * | 10/1970 | Preston | B44D 3/123 248/309.4 |
| 3,833,196 A | * | 9/1974 | Protzman | G03B 17/561 396/428 |
| 4,112,717 A | * | 9/1978 | Bradley | E05B 19/0005 70/351 |
| 4,664,041 A | * | 5/1987 | Wood | A45F 3/44 109/51 |
| 4,933,691 A | * | 6/1990 | Leslie | B60R 11/04 396/428 |

(Continued)

FOREIGN PATENT DOCUMENTS

| | | | | | |
|---|---|---|---|---|---|
| CN | 110696736 A | * | 1/2020 | | B60R 11/04 |
| DE | 102019100237 A1 | * | 7/2019 | | G01D 11/245 |

(Continued)

*Primary Examiner* — Taylor Morris
(74) *Attorney, Agent, or Firm* — Dunlap Bennett & Ludwig, PLLC

(57) ABSTRACT

A window-mounted system, apparatus, and method for securing one or more devices to a window of a vehicle or other similar property to collect data, display data, and/or utilize any function the device mounted may offer including surveilling a vehicle. The window-mounted system includes a mounting assembly connected to a surveillance assembly, wherein the mounting assembly engages an upper portion of a window of a vehicle or similar property. The surveillance portion provides an arrangement of unit cases, wherein each unit case retains a device for data collection, displaying data and/or surveilling a vehicle or property.

5 Claims, 4 Drawing Sheets

(56) References Cited

U.S. PATENT DOCUMENTS

| | | | | |
|---|---|---|---|---|
| 8,201,785 B2* | 6/2012 | Goodman | .............. | F16M 11/14 |
| | | | | 396/427 |
| 8,398,316 B2* | 3/2013 | Mota | .................. | G03B 17/561 |
| | | | | 248/215 |
| 8,973,751 B2* | 3/2015 | Cuddeback | ............ | G03B 17/08 |
| | | | | 206/316.2 |
| 9,921,464 B1* | 3/2018 | Choi | ....................... | F16M 13/04 |
| 9,998,637 B2* | 6/2018 | Burkholder | .......... | F16M 13/022 |
| 10,027,948 B2* | 7/2018 | Cole | .................... | H04N 13/246 |
| 10,151,968 B2* | 12/2018 | Roots | ...................... | H04M 1/00 |
| 10,377,323 B2* | 8/2019 | Beatty | ..................... | B60R 11/06 |
| 2007/0132610 A1* | 6/2007 | Guernalec | ............... | B60R 11/04 |
| | | | | 348/148 |
| 2011/0248060 A1* | 10/2011 | Luk | ......................... | B60R 11/02 |
| | | | | 224/567 |
| 2014/0153916 A1* | 6/2014 | Kintner | ............... | H04N 13/243 |
| | | | | 396/419 |
| 2021/0314532 A1* | 10/2021 | Pritchett | ................ | H04N 7/183 |
| 2021/0337090 A1* | 10/2021 | Pritchett | ................ | F16M 13/00 |

FOREIGN PATENT DOCUMENTS

| | | | | |
|---|---|---|---|---|
| DE | 202020105047 U1 * | 10/2020 | ............. | B60R 11/04 |
| EP | 3248842 A1 * | 11/2017 | ............... | B60Q 1/36 |
| GB | 2510622 A * | 8/2014 | ............ | B60R 11/04 |
| JP | 2017052357 A * | 3/2017 | ............ | B60K 35/00 |
| SE | 544537 C2 * | 7/2022 | ............ | B60R 11/04 |
| WO | WO-2017121563 A1 * | 7/2017 | ............. | B60R 11/04 |

* cited by examiner

MOUNTING SYSTEM, APPARATUS, AND METHOD FOR SECURING ONE OR MORE DEVICES TO A VEHICLE WINDOW

CROSS-REFERENCE TO RELATED APPLICATION

This application claims the benefit of priority of U.S. provisional application No. 63/360,186, filed 13 Sep. 2021, the contents of which are herein incorporated by reference.

BACKGROUND OF THE INVENTION

The present invention relates to vehicle-mounted systems for collecting data and/or displaying data, including recording video and audio. More particularly, a window-mounted system, apparatus, and method for securing one or more devices to allow the device or devices to collect or display data after being mounted on a window of a vehicle or similar property.

A simple car alarm is an electronic device installed in a vehicle to discourage theft of the vehicle itself, its contents, or both by emitting high-volume sound (often a vehicle-mounted siren) when the conditions necessary for triggering it are met. For a more sophisticated theft prevention system, as well as a system to result in evidence that can be used to aid in recovering stolen property and punish those responsible, video surveillance of the vehicle may include video systems for recording and displaying activity inside and around the vehicle. However, these video surveillance systems are typically dashboard installed. Other such devices also have a problem seeing heat/motion from inside of the vehicle.

As can be seen, there is a need for a window-mounted system for securing one or more devices to collect or display data after the device is mounted on to a window of the surveilled vehicle or property, wherein the present invention sits outside of the vehicle or property so that the device or devices can monitor activity, collect data, or display data about the vehicle or property in real time, 24 hours per day, seven days per week (24/7).

SUMMARY OF THE INVENTION

In one aspect of the present invention, a window-mounted vehicle surveillance system includes the following: a mounting assembly for engaging an upper edge of a vehicle or a similar property's window; and a surveillance assembly connected to the mounting assembly, wherein the surveillance or data gathering or data displaying assembly provides a singular or multi-angular arrangement for a plurality of unit cases, wherein the multi-angular arrangement can be defined as a triangular prism or other shapes.

In another aspect of the present invention, a window-mounted vehicle surveillance system further includes wherein the mounting assembly comprises a bent plate for engaging the upper edge of the vehicle window or other similarly property; wherein one bent portion of the bent plate provides a hollow rolled portion for customer handling of the surveillance assembly, wherein an upright directly connects the bent plate and a support plate supporting the surveillance assembly, wherein each unit case defines a housing to slidably receive a device to collect or display data, wherein each unit case has an upper opening defined, in part, by two longitudinal walls designed with openings to allow the device or devices to operate, and wherein each longitudinal wall provides a surrounding slot just downward of the upper opening; and further including a lid dimensioned and adapted to slidably be received by said two slots, substantially closing off the upper opening in a closed position, wherein the lid has an upturned portion on one end and a lock hole on another end so that in the closed position the unit case is movable from an unlocked condition to a locked condition; and when a lock engages the lock hole in the closed position to effectuate the locked condition In yet another aspect of the present invention, the method of surveilling a vehicle or similar property, the method includes providing the above-mentioned window-mounted vehicle surveillance system, engaging the mounting assembly to the upper edge of said window; sliding one device to collect or display data in each unit case, wherein each device is configured to capture video, collect, display data or utilize other functions of the device; and moving each unit case to the locked condition.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a window-mounted system, apparatus, and/or a method for securing one or more devices to a window of a vehicle or similar property so the secured device can collect data and display data for the owner's use, including surveilling about a vehicle or other similar property to utilize any feature the secured device or secured devices may offer.

Figure 1:
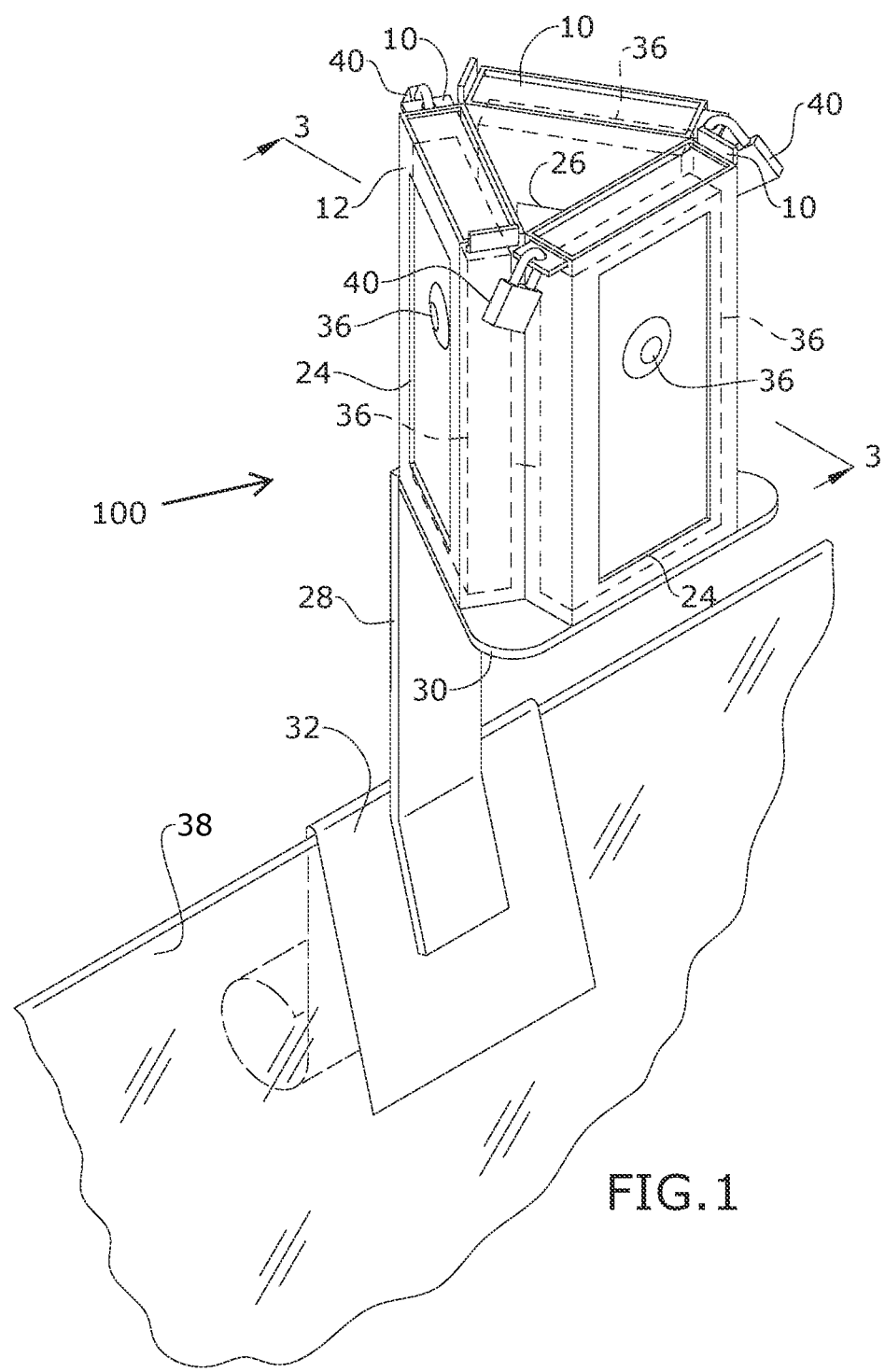
FIG. 1 is a perspective view of an exemplary embodiment of the present invention, shown in use.
Figure 2:
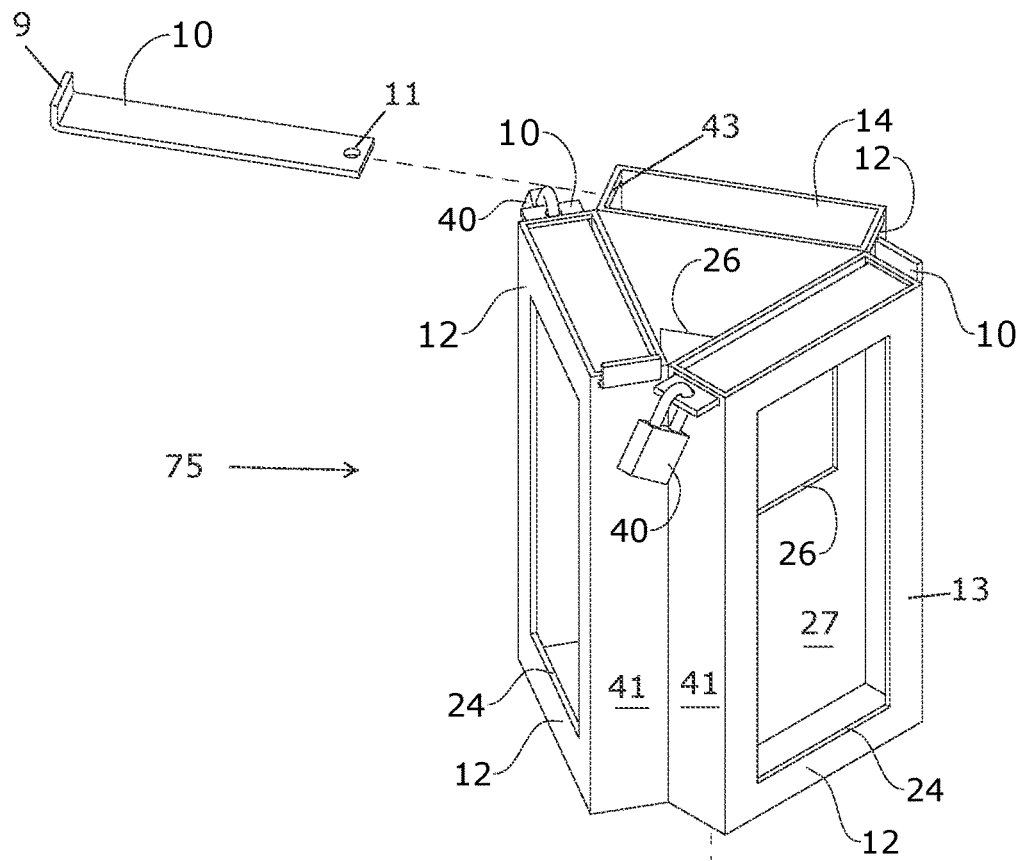
FIG. 2 is an exploded perspective view of an exemplary embodiment of the present invention.
Figure 2:
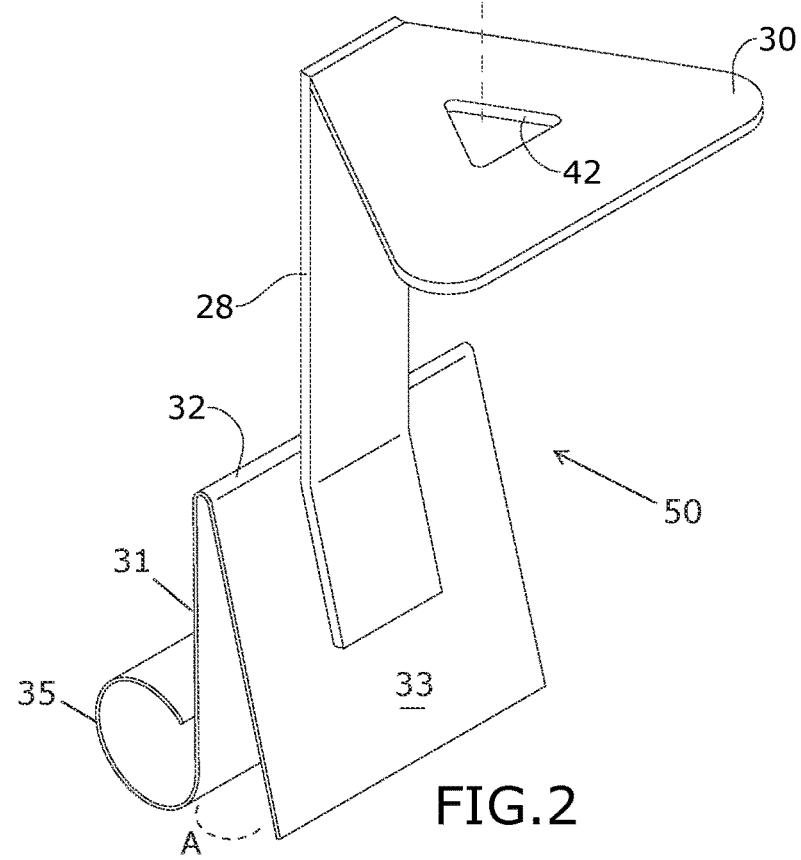
Figure 3:
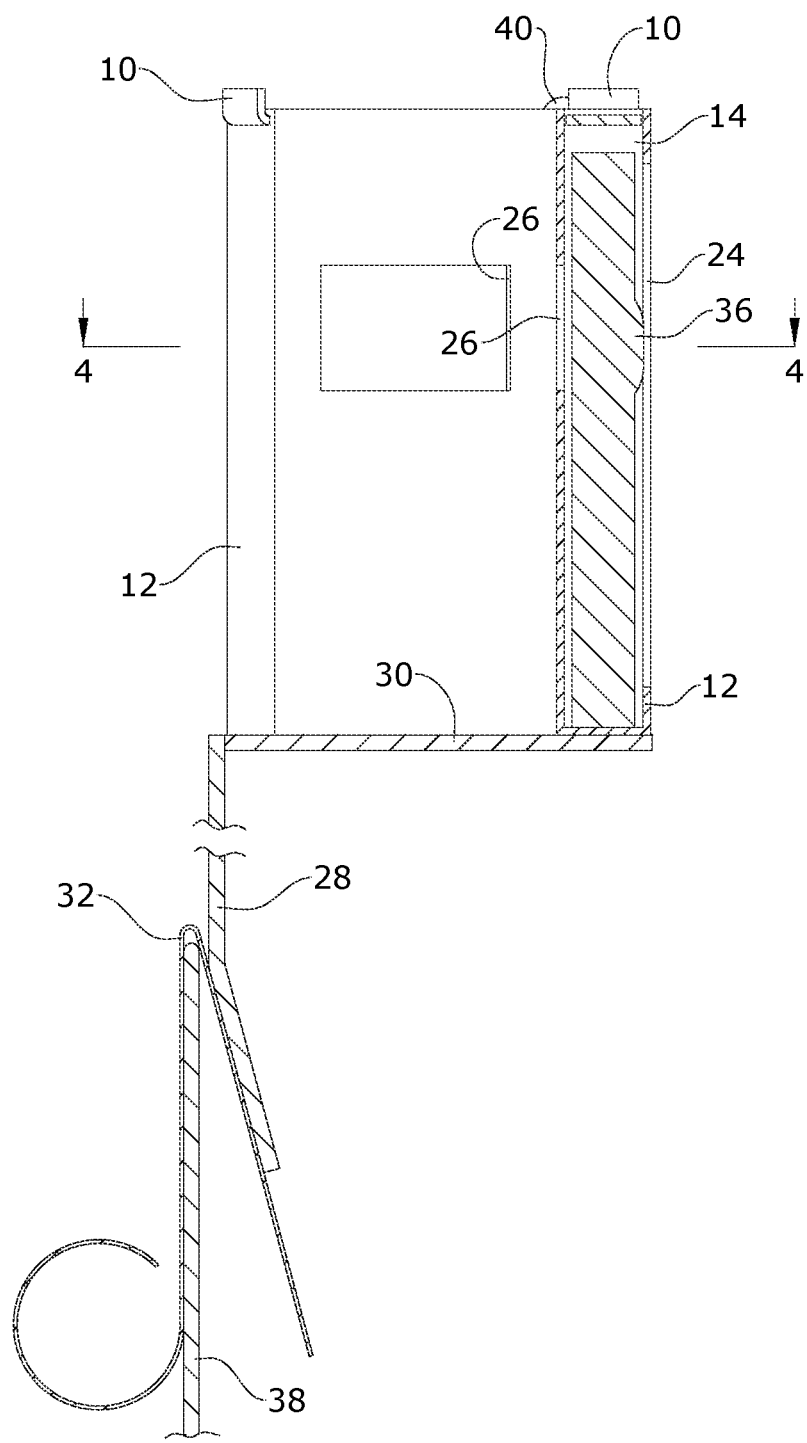
FIG. 3 is a section view of an exemplary embodiment of the present invention, taken along line 3-3 in FIG. 1, with the devices 36 simplified for clarity.
Figure 4:
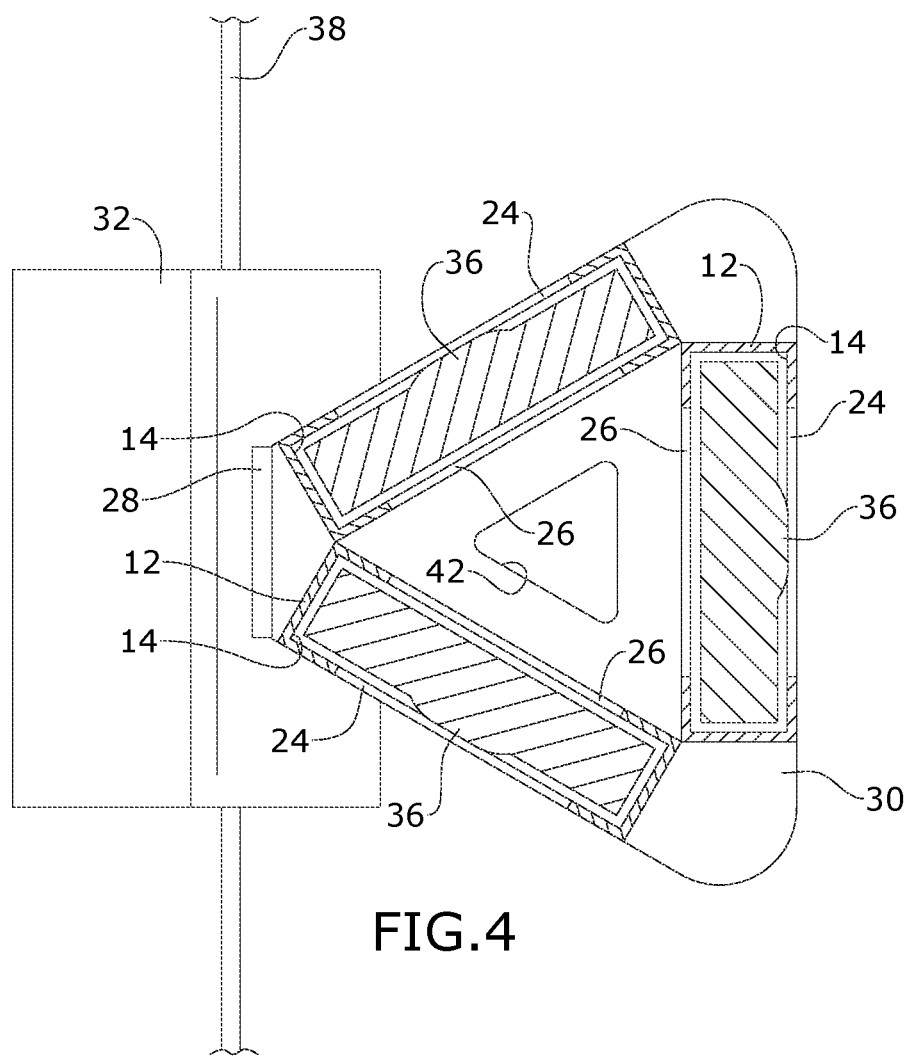
FIG. 4 is a section view of an exemplary embodiment of the present invention, taken along line 4-4 in FIG. 3, with the devices 36 simplified for clarity.

Referring now to FIGS. 1 through 4, the present invention may include a mounting assembly 50 and a surveillance assembly 75 that operatively associate to define a window-mounted surveillance system 100.

The mounting assembly 50 may include an engagement portion 32 and a support plate 30. The support plate 30 may be connected to the engagement portion 32 by way of an upright 28. The engagement portion 32 may include a bent plate defining an angle A of between the two bent-together portion 31 and 33. Said angle A may be less than twenty degrees. A proximal portion of one or both bent portions 31 and/or 33 may terminate in rolled portion 35, wherein the rolled element 35 rotates at least 180 degrees about a shared longitudinal-rotational axis. The rolled element 35 provides counterweight to the support plate 30, which may project in a direction opposite of the direction the rolled portion 35 does, relative to the upright 28. The support plate 30 may provide a cable slot 42.

The surveillance assembly 75 may include a plurality of unit cases 12 which are connected edge-to-edge so as to define a hollow triangular prism or other angular shape. Each unit case 12 may be generally cuboid with a rear face 27 and opposing front face 13 wherein two longitudinal sidewalls 41 and a bottom wall interconnect the rear and front faces 27 and 13 along their edges. The rear face 27 may have a rear cutout 26, while the front face 13 may have a larger front cutout 24. Each unit case 12 may be dimensioned and adapted to slidable receive a device 36 through a top opening 14. The device 36 may have video, image, and audio capturing components. Thereby, each device 36 can capture image, video, and audio data, particularly images and videos through the front cutout 24, in and around it mounted position. Each device 36 may have the functionality by way of its user interface, for instance, to display data collected. Each device 36 may have the capabilities to scan faces, determine a heartbeat, or collected any data collectable by way of electronics now known of developed in the future.

The triangular prism enables images/video captured from three perspectives. The triangular prism could have more angles and be equilateral, isosceles, or scalene, etc.

The two opposing longitudinal sidewalls 41 of each unit case 12 may each provide a slot 43 just downward of the top opening 14. The slots 43 are dimensioned and adapted to slidably receive a lid 10. The lid 10 may be L-shaped or otherwise shaped with a lock hole 11 on one end and an upturned portion or other movement preventing shape or design 9 on the opposing end. The upturned portion 9 is dimensioned and adapted to prevent the lid 10 from sliding through the slot 43 it engages. The elongated body portion between the upturned portion 9 and the lock hole 11 is dimensioned to substantially cover the top opening 14 when the lid 10 is slidably engaged through both slots 43. In this engaged position, a lock 40 may connect through the lock hole 11, thereby preventing the lid 10 from being slid out of the slots 43, forming a locked engagement.

The triangular prism arrangement of the surveillance assembly 75 facilitates the devices 36 capturing images and videos from at least three perspectives, including images and videos inside the vehicle (not shown) and around the vehicle.

A method of using the present invention may include the following. The window-mounted surveillance system 100 disclosed above may be provided. The user may prop the engagement portion 32 on an upper edge of the vehicle's window 38, which is slid between the bent portion 31 and 32. In one of more of the plurality of unit cases 12 a device 36 is retained through the top opening 14 in an open condition. Then for each unit case 12 retaining a device 36, the lid 10 is slid through the slots 43 and moved from an unlocked engagement to the locked engagement by connecting the lock 40 to the lock hole 11.

Thereby, the image and video capturing devices 36 monitor in and around the vehicle 24/7. Additionally, the present invention may be used for advertising to show the screen of a device 36 in a secure locked engagement so that the device(s) cannot be stolen.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A window-mounted system comprising:
   a mounting assembly for engaging an upper edge of a window;
   a surveillance assembly connected to the mounting assembly, wherein the surveillance assembly provides three unit cases arranged in triangular prism arrangement, wherein each unit case is dimensioned to slidably receive a device configured to collect and display data, wherein each unit case defines a cuboid housing dimensioned to slidably receive said device, wherein each unit case has an upper opening defined, in part, by two longitudinal walls, and wherein each longitudinal wall provides a slot opening just downward of the upper opening; and
   a lid dimensioned and adapted to slidably be received by said two slot openings, substantially closing off the upper opening in a closed position, wherein the lid has an upturned portion on one end and a lock hole on another end so that in the closed position the unit lid is movable from an unlocked condition to a locked condition by way of engaging the lock hole with a lock, whereby property associated with the window can be surveilled and monitored.

2. The window-mounted system of claim 1, wherein the mounting assembly comprises a plate that engages said upper edge.

3. The window-mounted system of claim 2, wherein the plate has a bend, and wherein an edge of the bent plate provides a hollow rolled portion for the handling of the mounting assembly.

4. The window-mounted system of claim 3, wherein an upright directly connects the bent plate and a support plate supporting the surveillance assembly.

5. A method of surveilling a vehicle the method comprising:
- providing the window-mounted system of claim 1;
- engaging the mounting assembly to the upper edge of the window of the vehicle;
- sliding one device in each unit case; and
- moving each unit case lid to the locked condition.

* * * * *